United States Patent [19]

Hallack et al.

[11] 4,203,836
[45] May 20, 1980

[54] METHOD AND APPARATUS FOR REMOVING PRECIPITATED SUSPENDED SOLIDS FROM AN EFFLUENT

[76] Inventors: Richard D. Hallack, 500 Oak Knoll Ave. #24, Pasadena, Calif. 91101; Tommie B. Carter, 806 Valencia Mesa Dr., Fullerton, Calif. 92632

[21] Appl. No.: 924,373

[22] Filed: Jul. 13, 1978

Related U.S. Application Data

[63] Continuation-in-part of Ser. No. 777,687, Jun. 25, 1977, abandoned.

[51] Int. Cl.² ........................ C02B 1/20; B01D 33/00
[52] U.S. Cl. ................................... 210/42 R; 210/68; 210/258; 210/387; 210/406
[58] Field of Search .................... 210/24 R, 28, 30 R, 210/38 B, 66–68–77, 79, 258, 387, 400, 401, 406, 42 R, 51

[56] References Cited

U.S. PATENT DOCUMENTS

| 2,026,969 | 1/1936 | Flynn | 210/67 |
|---|---|---|---|
| 2,096,176 | 10/1937 | Harrington | 210/152 |
| 2,736,434 | 2/1956 | Yacoe | 210/387 |
| 3,243,044 | 3/1966 | Moll | 210/387 |
| 3,358,834 | 12/1967 | Elhindi | 210/400 |
| 3,559,807 | 2/1971 | Reilly | 210/68 |
| 3,690,466 | 9/1972 | Lee et al. | 210/387 |

Primary Examiner—Thomas G. Wyse
Assistant Examiner—Peter A. Hruskoci
Attorney, Agent, or Firm—Christie, Parker & Hale

[57] ABSTRACT

A method and apparatus for conducting the method is provided for separating suspended solids such as, nickel, chromium, zinc, copper, iron, etc., from a liquid containing such solids. The method comprises contacting such a liquid containing suspended solids with a liquid-absorbing medium. The liquid-absorbing medium selectively absorbs the liquid to the substantial exclusion of absorbing the suspended solids. After some liquid is absorbed, absorbed liquid is removed from the medium to refresh the medium and allow for the absorption of additional liquid concomitantly with the removal of liquid. The liquid removed from the liquid-absorbing medium is effectively separated from the solids. The apparatus comprises a solids-liquid separation unit which includes a perforated base having a dish-shaped upper portion. A liquid-absorbing medium is placed across the top of the base to form a seal over the perforations therein. A liquid-receiving chamber is provided below the perforated base. A means for removing absorbed liquid from the liquid-absorbing medium is provided within the liquid-receiving chamber. A drying unit can also be provided, and the liquid-absorbing medium can be moved from the solids-liquid separtion unit to the drying unit for drying the medium and for permitting the solids to be removed from the liquid-absorbing medium.

7 Claims, 3 Drawing Figures

METHOD AND APPARATUS FOR REMOVING PRECIPITATED SUSPENDED SOLIDS FROM AN EFFLUENT

CROSS-REFERENCE

This application is a continuation-in-part of applicants' co-pending application, Ser. No. 777,687, filed June 25, 1977 now abandoned.

BACKGROUND OF THE INVENTION

There is an ever increasing need to remove solids from liquid streams which can contain solids. Many waste streams from industrial, manufacturing or other processes often contain solids which are undesirable or which can pollute natural waterways if such waste streams are directed into such waterways without complete solids separation.

For example, the separation of precipitated metal hydroxides from effluent water is a most cumbersome and expensive part of the prior art metal finishing waste treatment. Precipitated metal hydroxides, such as nickel, chromium, zinc, copper, iron, and the like, are bound with water in the effluent from plating plants, and the like, and the floc formed has nearly the same specific gravity as the water. This factor tends to keep the flocculent precipitate in suspension, and it has proven most difficult and time consuming to attempt to settle the precipitated particles in the prior art settling tanks. It has been found that the more dilute the waste, the harder it is to settle the precipitated hydroxides. In general, the prior art settling tanks require an inordinate amount of time to perform their settling function to any material extent, and are incapable of removing the precipitates in sufficient quantities to satisfy present and proposed government standards with respect to effluent purity. Additives, such as aluminum sulfate, ferric salts, or polyelectrolytes are used in the prior art settling processes in an effort to promote the precipitation and settling of the precipitates.

SUMMARY OF THE INVENTION

A method for separating suspended solids from a liquid and an apparatus for conducting such a method is disclosed. The method comprises contacting liquid which contains suspended solids with a liquid-absorbing medium. The liquid is absorbed into the liquid-absorbing medium leaving the suspended solids unabsorbed. While such liquid is being absorbed, absorbed liquid is removed from the liquid-absorbing medium at a position away from the unabsorbed solids. Generally, the liquid-absorbing medium is provided with the two opposing surfaces, one surface for absorption of the liquid and the opposing surface for removal of absorbed liquid. Such liquid withdrawn from the liquid-absorbing medium is thereby effectively separated from the unabsorbed solids. Concomitantly with removal of absorbed liquid from the liquid-absorbing medium, additional liquid is absorbed into the liquid-absorbing medium as the absorbing propensity of the liquid-absorbing medium is refreshed by the removal of previously absorbed liquid. The liquid-absorbing medium is capable of selectively absorbing the liquid present in a mixture of liquid and suspended solids to the substantial exclusion of absorbing the suspended solids. Such a liquid-absorbing medium can be an absorbent paper which has a sufficient wet strength for preventing tearing or perforations from forming when in use.

The liquid which has been absorbed by the liquid-absorbing medium can be removed from such liquid-absorbing medium by use of a vacuum. A vacuum is useful in increasing the rate of liquid removal from the absorbing medium and thereby also increasing the rate of absorption of the liquid and rate of solids separation.

The apparatus for conducting the method for removing suspended solids from liquid comprises a solids-liquid separation unit including a perforated base and having a liquid-receiving chamber under said base. A liquid-absorbing medium, such as an absorbent paper, is positioned on the upper surface of the base and covers the perforations in the base. Means are provided on the apparatus for introducing a liquid which contains suspended solids to the solids-liquid separation unit. Additionally, means are provided for removing the absorbed liquid from the liquid-absorbing medium and collecting the liquid in the liquid-receiving chamber. Such means for removing the absorbed liquid can include a pump having an intake coupled to the liquid-receiving chamber for establishing a vacuum in the liquid-receiving chamber and creating a suction pressure on the underside of the liquid absorbing medium through the perforations in the base.

Specifically, the method and apparatus of this invention can be used to separate a liquid from an effluent liquid stream containing precipitated suspended solids. The liquid waste stream from an electroplating process or metal finishing process, which generally contains precipitated metal hydroxides suspended in water, can especially be treated by the method of this invention. When the apparatus of the present invention is used on such a stream, only little pretreatment of the stream is necessary. There is no need for any additives to promote precipitation or settling. The only pretreatment that is required is to destroy any cyanides in the effluent, reduce any chromium ions present, and adjust the pH of the effluent to a predetermined value generally greater than a pH of 8.0. The apparatus of the invention is capable of reducing the metal hydroxide suspended solids in the effluent to a level less than about 25 parts per million (ppm), with no settling time requirements and on an economical basis. Such a low solids content is generally beyond the capabilities of the prior art settling tanks.

The practice of the method in combination with a constructed embodiment of the apparatus of the invention, is capable of reducing the concentration of a precipitated zinc hydroxide in an aqueous suspension from 2,000 ppm to less than 1 ppm, and of reducing the concentration of a precipitated nickel hydroxide from 1,000 ppm to less than 5 ppm. The constructed embodiment has flow rates of the solids-liquid suspension to be treated ranging from about 600 gallons per hour to about 3,000 gallons per hour, depending on the types of suspended solids to be removed, and the concentration of the suspended solids in the liquid.

The method and apparatus are also capable of separating liquids from liquids due to selective absorption of one of the liquids by the liquid-absorbing medium to the substantial exclusion of absorbing the other liquid. As the liquid-absorbing medium used on the method has a strong affinity for water, an aqueous emulsion containing droplets of organic liquids can be treated by the method and apparatus for separating the aqueous liquid from the organic liquids.

DETAILED DESCRIPTION OF THE INVENTION

Figure 1:
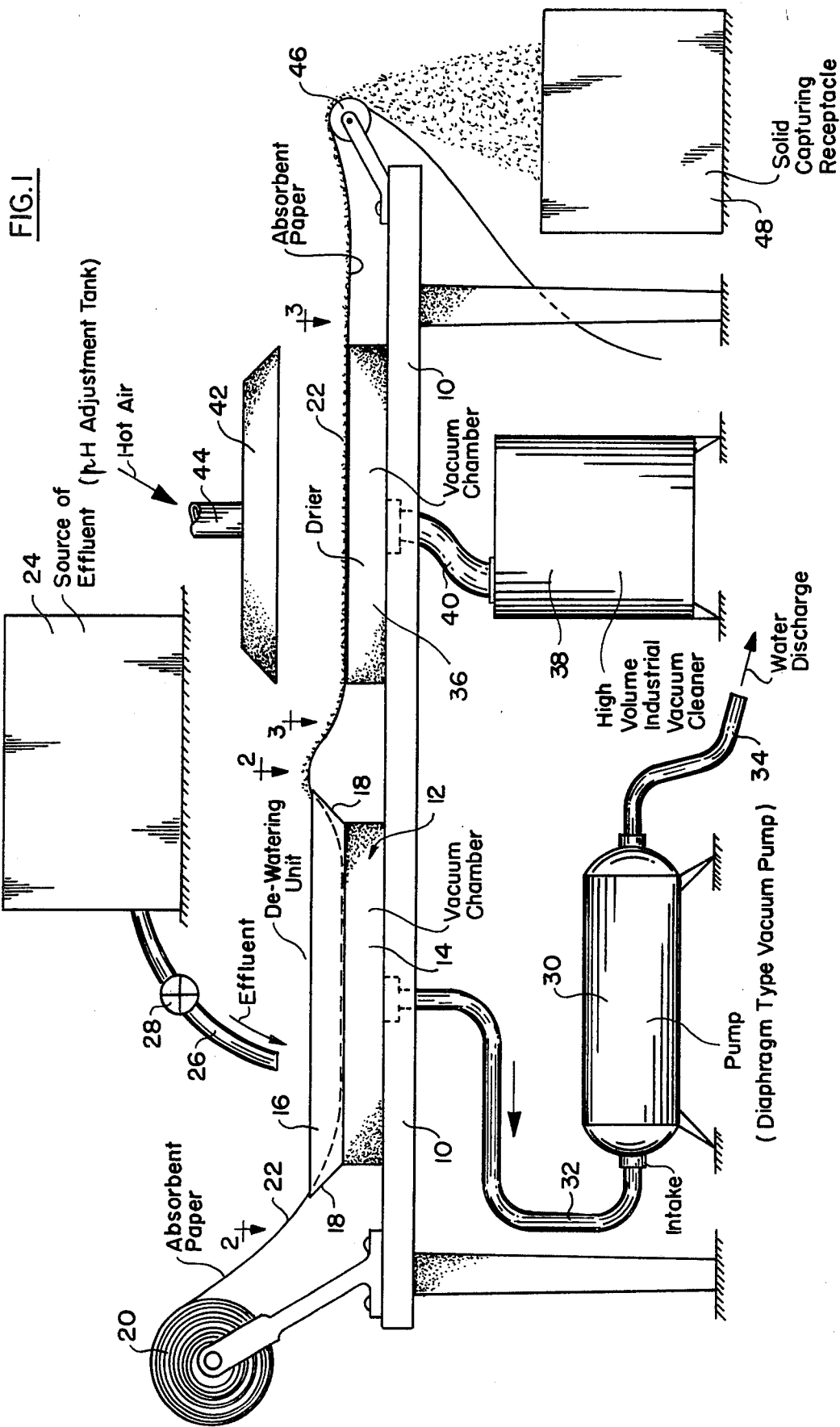
FIG. 1 is a schematic representation of apparatus for removing suspended solids from an effluent liquid stream constructed in accordance with one embodiment of the invention.

The method for removing suspended solids from a suspension of a liquid containing suspended solids and the apparatus for conducting such method will be described in relation to the drawings. FIG. 1 illustrates a working embodiment of apparatus for conducting the method of this invention. The apparatus illustrated in FIG. 1 is the preferred apparatus for use in removing suspended solids from an aqueous effluent liquid containing suspended solids. For example, the apparatus illustrated in FIG. 1 is the preferred apparatus for separating suspended metal hydroxide particles from water in which they are suspended. Metal hydroxide particles which can be separated by the method and apparatus are the hydroxides of metals such as nickel, zinc, cadmium, copper, chromium and mixtures thereof. Such metals generally can be found in effluent streams from metal finishing or metal plating industrial processes.

The method herein described separates suspended solids from the liquid in which they are suspended by selective absorption of the liquid using a liquid absorbing medium which absorbs the liquid and leaves the solids substantially unabsorbed. The method in theory can be used to separate any suspended solids from liquids in which they are contained because of the selective absorptivity of the liquid absorbing medium. For ease of discussion, the method will be described herein in terms of separating suspended metal solids from water in which they are contained. Metals, such as nickel, zinc, cadmium, copper and chromium are readily suspended in water by forming the hydroxides of the metals. The metal hydroxides are generally insoluble in water and tend to form floccules having a variety of particle sizes which are suspended in the water. The flocculent precipitate formed by the metal hydroxides in water is difficult to separate from the water due to the fine particle size of some of the floccules and due to the apparent density of the floccules. The apparent density of the floccules is near the density of water. Due to this apparent density, a substantially long period of time is required to settle the flocculent precipitate from the liquid.

Figure 3:
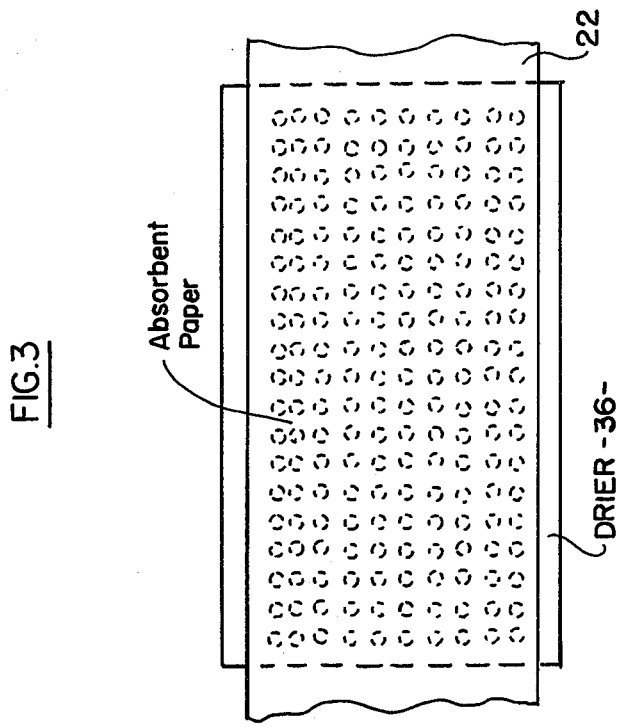
FIG. 3 is a view taken essentially along the line 3—3 of FIG. 1.
Figure 2:
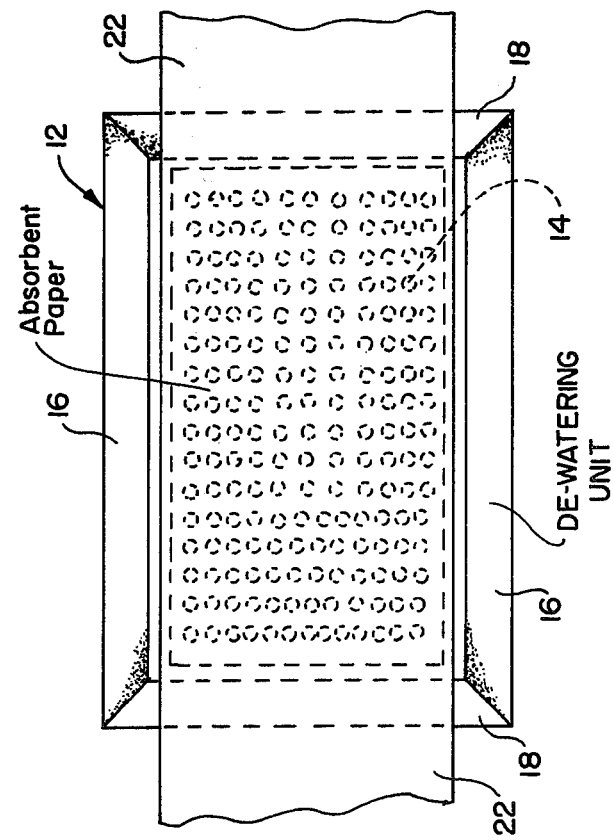
FIG. 2 is a view taken essentially along the line 2—2 of FIG. 1.

With reference to the drawings, the apparatus shown in FIGS. 1–3 is supported on a table 10. The apparatus includes a solids-liquid separation unit 12, which, as shown in FIG. 2, has a generally rectangular configuration. When the method of solids separation is practiced on an effluent stream containing suspended metal hydroxides in water, such a solids-liquid separation unit can be referred to as a dewatering unit as labeled in FIGS. 1 and 2. The solids-liquid separation unit includes a base 14 which is perforated and which encloses a liquid receiving chamber which can also be a vacuum chamber. The upper portion of the solids-liquid separation unit has sides 16 and ends 18 providing a dish-shaped configuration.

A liquid absorbent medium 22 is positioned within the dished-shaped cavity of the solids-liquid separation unit 12. The liquid absorbing medium is planar in physical configuration and contacts the sides 16 and ends 18 of the solids-liquid separation unit, effectively sealing the liquid absorbing medium to such sides and ends and thereby preventing any liquid or suspended solids from passing around the edges of the liquid absorbing medium 22.

The liquid absorbing medium is a paper having a basis weight from about 28 to about 34 pounds per ream and a caliper from about 0.0130 to about 0.0145 inches, and has a caliper variation of a maximum of about 0.008 inches.

The preferred paper useful as a liquid absorbing medium in the practice of the method of this invention is manufactured using a process referred to as a "crepe process." The "crepe process" is a term known to those in the paper manufacturing art which refers to a process of packing pulp fibers and pressing such pulp fibers into a given area. Such pulp fibers are pressed forming the paper by a force exerted at right angles to the plane of the paper being formed. That is, a force is exerted in the direction of the length of the paper to bunch the pulp fibers together. This method is contrasted with the "embossing process" wherein a force is exerted at right angles to the plane of the paper being formed. The crepe process provides more pulp fiber per square area (a greater pulp density) than the embossing process. The crepe process also provides ridges and wrinkles in the texture of the paper providing an effective surface area greater than the calculated surface area for a given length and width of such paper. Paper prepared using the crepe process has significant strength due to the pulp density and overlapping of fibers. Therefore, paper manufactured by the crepe process is especially useful in the process of this invention as the relatively high pulp density provides strength to the paper when the paper is wetted.

The preferred paper for use in the practice of the method of this invention having the above specifications is commercially available and the commercially available paper is acceptable for use in this method. The commercially available paper, generally has the characteristics of industrial paper toweling. For example, a preferred liquid-absorbing medium having the above specifications is industrial paper toweling as manufactured by Publishers Paper Company, b 419 Main Street, Oregon City, Oregon 97045, and designated as Grade No. 594. This preferred paper has a basis weight of about 31.5 to about 32.0 pounds and a caliper of about 0.0137 to about 0.0142. Additional characteristics of such paper include an aged-wet tensile strength from about 16 to 25 ounces. The absorption for such paper unaged is preferably less than 20 seconds and the absorption aged is preferably less than 40 seconds for paper which has been aged five minutes at 300° F. The "W" dry tensile strength for a strip of the paper ½ inch wide by 4 inches long is at least 3.5 pounds and the "A" dry tensile strength for the same dimensioned strip of the paper is at least 1.5 pounds. The paper is prepared by the crepe process from a mixture of ground wood particles and 50 percent sulfite solution. The pH tray when making the paper from the mixture is maintained at a pH from about 4.8 to about 5.0.

The paper is provided on a roll and the roll 20 of such liquid absorbing paper is mounted at one end of the table 10 adjacent to the solids-liquid separation unit 12.

The absorbent paper, as the liquid-absorbing medium 22, is drawn from the roll and placed in the dish-shaped upper portion of the solids-liquid separation unit 12. The liquid-absorbing medium 22 extends between up along the sides 16 and over the ends 18 of the solids-liquid separation unit. The paper completely covers the perforations in the base and upon being wetted the paper clings to the solids-liquid separation unit for effectively preventing liquid from passing around the edges and under the paper. If liquid were able to pass around and under the liquid-absorbing medium, solids which could be entrained in that liquid could also pass around and under the medium and thereby contaminate the liquid in the liquid-receiving chamber.

The liquid containing suspended solids is stored in a tank 24. Such a tank 24 can be used for pretreatment of the liquid or can simply be a storage tank. For example, a liquid stream containing dissolved metals can be pretreated for removing the dissolved metals from solution thereby enabling later separation of the liquid from the precipitated solids formed. For example, an effluent liquid stream from a metal processing plant can contain dissolved metals. The effluent liquid stream can be treated, such as in a tank 24, with a strong base for forming hydroxides of the various metals present, which hydroxides are generally insoluble in an aqueous medium. The tank 24 can also be used as a settling tank to eliminate those solids which can be present in the liquid stream and which can be separated from the liquid by a settling process.

In the practice of the method in regard to the treatment of a liquid effluent stream from a metal processing plant, a preconditioning step is utilized to destroy any cyanides which may be present in the effluent. The pH of the effluent is adjusted to a range from about 10.5 to about 11 and the effluent is chlorinated to destroy any cyanides present. Next, the solution is placed in a pH adjustment tank in which the pH is adjusted to the proper level for the metals present to be precipitated. Appropriate pH values for different metals which can be precipitated and removed by this method are as follows: nickel, 10.5; zinc, 10.0; cadmium, 10.5; copper, 8.25; and chromium, 8.20.

The liquid with suspended precipitated solids in the pH adjustment tank is then transferred to the solids-liquid separation unit. In order to remove chromium metal particles from such an effluent liquid stream, hexavalent chromium is first reduced to trivalent chromium by the use of sodium metabisulfate. The resulting solution is then transferred to the pH adjustment tank and the pH is adjusted to 8.20 for precipitating the chromium.

A quantity of the liquid containing suspended solids is transferred from the tank 24 and fed onto the upper portion of the solids-liquid separation unit 12 through a pipeline 26 and under the control of an appropriate valve 28.

The liquid is flowed onto and thereby contacted with the liquid-absorbing medium which covers the perforations in the base 14. The wetted edges of the liquid-absorbing medium provide an effective seal along the sides 16 and ends 18 of the solids liquid separation unit for substantially preventing any of the liquid with suspended solids from passing around the edges of the liquid-absorbing medium and under such medium and subsequently through the perforations in base 14.

The liquid is absorbed into the liquid-absorbing medium 22 in the solids-liquid separation 12, and the liquid-absorbing medium becomes saturated with the liquid. The liquid is absorbed into the liquid-absorbing medium leaving the suspended solids unabsorbed. Due to the absorbent properties of the liquid absorbing medium for liquids, the liquid is absorbed into the liquid-absorbing medium and saturates such medium. After the liquid-absorbing medium has been saturated with the liquid, the medium can absorb substantially no additional liquid. Therefore, means are provided for removing absorbed liquid from the liquid-absorbing medium thereby refreshing the absorbent properties of the liquid-absorbing medium. Means for removing absorbed liquid can be a vacuum pump 30 which has its intake coupled through a pipeline 32 to the liquid-receiving chamber forming a vacuum chamber in the base of the solids-liquid separation unit. The vacuum pump 30 provides a vacuum in the liquid-receiving chamber which vacuum effectively removes liquid from the underside of the liquid-absorbing medium 22. Without such means for removing absorbed liquid from the liquid-absorbing medium, the absorbed liquid can, by gravity, drip from the liquid-absorbing medium after the medium has become saturated. However, it has been found that use of a vacuum in the liquid-receiving chamber below the liquid-absorbing medium increases the volume of liquid which can be absorbed into and removed from the liquid-absorbing medium than when gravity is relied upon.

The absorbed water being removed from the liquid-absorbing medium 22 passes through the perforations in the base 14. The liquid is collected and conveyed from the liquid-receiving chamber through the pipeline 32, into a pump 30 and is discharged through a line 34 through the discharge port of the vacuum pump 30. This liquid collected in the liquid-receiving chamber of the solids-liquid separation unit is substantially free of all suspended solids that were present in the initial liquid fed to the unit. For example, such liquid, when the initial liquid feed is an effluent containing metal hydroxide suspended precipitate including such metals as nickel, zinc, cadmium, copper, and chromium from a metal plating process, generally contains less than about 50 ppm of such suspended metals. In operative embodiments of the apparatus using this method the liquid collected in the liquid-receiving chamber has contained less than 20 ppm of such suspended metal solids.

The utility of the process and apparatus is shown by the following example which is not intended to limit the invention in any manner.

EXAMPLE 1

A solution containing suspended solids was prepared by suspending zinc metal hydroxide, copper metal hydroxide, iron metal hydroxide, and calcium in water. Upon analysis, the pH of the liquid containing suspended solids was determined to be 7.0. The total concentration of the suspended solids was greater than 50 ppm. The liquid with the suspended solids had a mint green coloration.

The apparatus used to conduct the method was the apparatus as shown in FIG. 1. The liquid-absorbing medium was paper manufactured by Publishers Paper Company and designated Grade No. 594. The paper was drawn from a roll and placed in contact with the solids-liquid separation unit covering the perforations in the base 14 of the solids-liquid separation unit. The liquid containing the suspended solids was agitated in the holding tank 24.

The vacuum pump 30 was turned on. When the vacuum in the liquid-receiving chamber of the solids-liquid separation unit was 0 inches mercury, one gallon of the test solution was removed from the holding tank and poured into the solids-liquid separation unit over the liquid-absorbing medium.

When the first gallon of liquid had been poured over the liquid-absorbing medium, the time period for initial absorption was recorded. The vacuum in the liquid-receiving chamber then registered 19 inches of mercury. A second gallon of the test liquid was poured onto the liquid-absorbing medium to maintain liquid on the paper. After the second gallon of test liquid was totally on the paper, the vacuum in the vacuum chamber was again determined to be 19 inches of mercury.

When all of the liquid was no longer visible upon viewing the solids-liquid separation unit, the time that had elapsed from initial absorption was 3 minutes and 15 seconds. At this time the vacuum pump was shut off.

The liquid, water, that had been removed from the liquid-receiving chamber by the vacuum pump was crystal clear and showed no visible signs of the presence of solids.

The liquid-absorbing medium exhibited no pinholing or tearing and the formerly suspended solids formed a thick and dense pack on the surface of the liquid-absorbing medium.

EXAMPLE 2

The experiment of Example 1 was repeated in all essential details except the test solution was an aqueous suspension of a waste stream from a metal plating process which contained 490 ppm nickel, 2.70 ppm cobalt, 1.30 ppm zinc, 1.20 ppm iron, 0.70 ppm copper and 0.14 ppm lead.

After separating the solids from the water, the water collected was analyzed by atomic absorption analysis. The separated water contained a total of about 5 ppm of the metals. The water contained 2.90 ppm nickel, 1.20 ppm cobalt, 0.49 ppm zinc, 0.06 ppm iron, 0.36 ppm copper and nondetectable lead (<0.1 ppm).

EXAMPLE 3

The experiment of Example 1 was repeated in all essential details except that the liquid-absorbing medium used in the experiment was a filter paper. The filter paper used was an alkaline filter paper No. 274 of Filter Media Inc., 31 Dwight Place, Fairfield, New Jersey. The filter paper had a nominal micron porosity of 15.

The vacuum reading at the end of the experiments read 11 inches of mercury. The total flow rate for two gallons of the test liquid containing suspended solids was 2 minutes, 56 seconds.

The liquid recovered from the liquid-receiving chamber appeared to contain suspended solids and the color of the liquid was a dark brown.

The filter paper used in this experiment is commercially available and is in general use for pressure filtration of electrolytes in the electroplating industry.

EXAMPLES 4-8

Additional comparative testing of various papers for use as the liquid-absorbing medium was conducted following the procedure described in Example 3. The essential details of the experiment of Example 3 were followed except for the substitution of a different paper as the liquid-absorbing medium.

The results of the comparative testing were as follows:

| Ex. | Paper | Flow Rate | Vacuum Reading at End | Liquid Separated | Condition of Paper |
| --- | --- | --- | --- | --- | --- |
| 4. | Press Enterprises Newsprint | 3 min., 31 sec. | 15 in. | Brownish | Pinholing |
| 5. | Gilbert Superase Typing Paper | None | 18 in. | None | Paper must be coated |
| 6. | Wax Paper | None | 19 in. | None | Coated |
| 7. | Benchmark yellow-lined tablet paper | 4 min., 10 sec. | 18 in. | Dark Brown | Solids went through paper |
| 8. | Manila-grade file folder | — | — | — | Paper would not conform to contour of solids-liquid separation unit |

The solid particles in the liquid fed onto the liquid-absorbing medium remain suspended in a thin film of the liquid which forms over the top of the medium. The solids remain suspended within the thin film and no tendency is exhibited for the solids to be drawn into the paper, or to clog the paper or apparatus.

In filtration separation processes, the effectiveness of the separation is related to the build up of a pack of the solids being separated upon the surface of the filter medium. The pack thereby supplementing the filter medium and acting as a filter medium itself. The method herein does not rely upon the formation of a pack upon the liquid-absorbing medium. Contrarily, any formation of a pack upon the surface of the liquid-absorbing medium would prevent that surface area from coming into contact with the liquid to be absorbed, thereby decreasing the capability of the liquid-absorbing medium to absorb the liquid. A pack does not form in the present method of separation until the liquid has been substantially, totally absorbed. The liquid-absorbing medium, however, even without the pack, is capable of separating solids from liquid suspensions when the solids content is initially very low. The following Example 9 illustrates solids separation from a liquid suspension initially containing less than 4 ppm solids.

EXAMPLE 9

The experiment of Example 1 was repeated in all essential details except the liquid containing suspended solids was an aqueous suspension containing about 0.04 ppm chromium and about 1.15 ppm zinc. The pH of the aqueous suspension during separation was about 7.4.

After separating the solids from the water, the separated water contained about 0.01 ppm chromium and 0.32 ppm zinc. The results show that efficient solids liquid separation occurs without the formation of a pack upon the surface of the liquid-absorbing medium.

After a predetermined amount of water has been drawn from the underside of the liquid-absorbing medium in the solids-liquid separation unit 12, the medium is drawn to a rectangular dryer 36. The dryer unit 36 has a perforated top, and a vacuum chamber is formed within its interior. A high volume industrial vacuum pump 38 is coupled to the vacuum chamber in the dryer unit 36 through a line 40. Hot air can be introduced over the top of the liquid-absorbing medium in the dryer unit by a hood 42, into which hot air can be introduced through an appropriate line 44. The action of the vacuum pump 38 and the hot air from hood 40 serves completely to dry the liquid-absorbing medium, and the medium, together with the separated solids, is then drawn over a roller 46 at the right-hand end of table 10. The solids can be collected in a receptacle 48 for reclamation purposes.

The method and apparatus also have utility for separating immiscible liquids. For example, when an aqueous liquid containing immiscible organic liquid is treated by this method, the water is absorbed by the liquid-absorbing medium to the substantial exclusion of absorbing the organic liquids. The water is thereby effectively separated from the organic liquids which remain unabsorbed. This method is, therefore, advantageous over filtration separation methods which are not capable of selectively separating an emulsion of immiscible liquids. Organic liquids are commonly found in waste streams such as in waste streams from the metal-processing and metal plating industries as various additives utilized in such processes.

The invention provides an economical method and apparatus for removing precipitated suspended solids from a liquid effluent in an economical and expeditious manner.

It will be appreciated that although a particular embodiment of the invention has been shown and described, modifications may be made. It is intended in the claims to cover all modifications which come within the true spirit and scope of the invention.

What is claimed is:

1. In a method for separating hydroxide-precipitative metals from an aqueous solution by the steps of adding a base to the solution for raising the pH of the solution above 8.0 and forming a hydroxide precipitate suspension of the metals present in the water, the improvement comprising the steps of:
    (a) feeding the aqueous suspension of precipitated metal hydroxides onto a surface of a liquid-absorbing medium comprising an industrial paper towel having a basis weight from about 28 to about 34 pounds per ream, a caliper from about 0.0130 to about 0.0145, an aged-wet tensile strength from about 16 to 25 ounces and an aged absorption of less than 40 seconds;
    (b) absorbing the water from the aqueous suspension into the liquid-absorbing medium leaving the suspended mtal hydroxides unabsorbed;
    (c) removing the absorbed water from the liquid-absorbing medium surface opposite the surface in contact with the aqueous suspension for providing additional absorption capability to the liquid-absorbing medium;
    (d) concomitantly absorbing additional water into the liquid-absorbing medium as a result of the removal of the previously absorbed water; and
    (e) collecting the water removed from the liquid-absorbing medium.

2. A method as recited in claim 1 wherein the absorbed liquid is removed from the liquid-absorbing medium by establishing a vacuum on a side of the liquid-absorbing medium opposite the side in contact with the liquid containing suspended solids.

3. A method as recited in claim 2 wherein the vacuum is from about 16 to about 22 inches of mercury.

4. The method as recited in claim 1 wherein the paper is manufactured by the crepe manufacturing process.

5. Apparatus for separating suspended metal hydroxides from an aqueous suspension containing metal hydroxides, said apparatus comprising:
    (a) a solid-liquid separation unit having a perforated base and a liquid-receiving chamber below said base;
    (b) a paper positioned on the base covering and sealing the perforations in the base for absorbing water from an aqueous suspension to the substantial exclusion of absorbing suspended metal hydroxides, said paper having a basis weight from about 28 to about 34 pounds per ream, a caliper from about 0.0130 to about 0.0145, an aged-wet tensile strength from about 16 to 25 ounces and an aged absorption of less than 40 seconds;
    (c) means for introducing an aqueous suspension containing suspended metal hydroxides onto the surface of the paper;
    (d) means for containing the liquid containing suspended metal hydroxides on the surface of the paper and preventing the liquid containing suspended metal hydroxides from flowing around the paper; and
    (e) means for removing absorbed water from the paper, said last named means comprising a vacuum paper having an intake coupled to the liquid-receiving chamber for establishing reduced pressure on the underside of the paper through the perforations in the base.

6. Apparatus as recited in claim 5 wherein the means for containing the liquid comprises a dish-shaped upper portion of the solids-liquid-separation unit and the paper which forms a seal with the dish-shaped upper portion of the solids-liquid separation unit.

7. Apparatus as recited in claim 5 further comprising a roll of the paper and means for feeding the paper to the upper surface of the base of the solids-liquid separation unit.

* * * * *

UNITED STATES PATENT AND TRADEMARK OFFICE
CERTIFICATE OF CORRECTION

PATENT NO. : 4,203,836
DATED : May 20, 1980
INVENTOR(S) : Richard D. Hallack and Tommie B. Carter It is certified that error appears in the above—identified patent and that said Letters Patent is hereby corrected as shown below:

Column 4, line 48, before "419" delete "b";

Column 10, line 42, delete "paper" and insert -- pump --.

Signed and Sealed this

Seventh Day of October 1980

[SEAL]

Attest:

SIDNEY A. DIAMOND

Attesting Officer

Commissioner of Patents and Trademarks